Patented June 7, 1949

2,472,640

UNITED STATES PATENT OFFICE 2,472,640

CLEAR AQUEOUS SOLUTIONS OF TYROTHRICIN

Paul W. Wilcox, Lansdowne, and Bernard B. Jatul, Norwood, Pa., assignors to Sharp & Dohme, Incorporated, Philadelphia, Pa., a corporation of Maryland No Drawing. Application February 10, 1945, Serial No. 577,327

9 Claims. (Cl. 167—65)

This invention relates to bacteriostatic preparations containing in an essentially aqueous, clear solution a water-insoluble, antibiotic, bacteriostatic agent, and particularly a water-insoluble, antibiotic, polypeptide, bacteriostatic agent, and especially the antibiotic agent tyrothricin and a non-ionic wetting agent which itself is soluble in water or in an essentially aqueous medium to give in either event a clear solution.

The extent of the therapeutic utilization of antibiotics such as tyrothricin particularly has been exceedingly limited and retarded because of the insolubility of such agent as tyrothricin in aqueous media and because it is not very effectively and extensively useful when dissolved in those media in which it is soluble, such as alcohol, acetone, dioxane, pyridine, glacial acetic acid and others, in view of the markedly undesirable toxicity of such vehicles. Attempts to employ such antibiotic agents as tyrothricin dissolved in these last indicated media diluted with water have been limited in result because of the instability of such mixtures and their deleterious effects in the various compositions containing the antibiotic and on the antibacterial activity of the agent. Such attempts have also been accompanied by other undesirable and unsuccessful results which contributed to the restricted, available use of these antibacterial agents.

According to the instant invention it has been found that the water-insoluble, antibiotic, bacteriostatic agents such as the water-insoluble, antibiotic polypeptides and especially tyrothricin can be prepared in the form of stable, transparent, clear solutions thereof in an aqueous medium and that such solution can be diluted to any desired extent without any change other than that of decrease in concentration, so that the therapeutic utilization of these antibacterial agents is thereby extensively expanded into numerous further applications heretofore unavailable.

Thus, the instant invention presents stable, antibacterially active, therapeutic preparations containing a water-insoluble, antibiotic antibacterial agent as the water-insoluble, antibiotic, antibacterial polypeptides, especially such as tyrothricin, clearly dissolved in an aqueous medium comprising a non-ionic wetting agent, that is, a non-ionic wetting agent which itself is soluble in water or in an essentially aqueous medium, to give in either event a clear solution.

While tyrothricin is indicated to be the particularly advantageously effective illustration of the suitable antibiotic, antibacterial constituent of the preparations covered by the invention, other water-insoluble, antibiotic, antibacterial agents may be used along with or in place of it, as well as such as are only limitedly soluble in water, such as subtilin, fumigacin, otherwise referred to as helvolic acid, or glitoxin, and the like. Both the water-insoluble and the limitedly soluble in water types are referred to generically herein and in the appending claims in the term water-insoluble.

The wetting agents useful in the compositions of the invention are non-ionic and are soluble in water or in an essentially aqueous medium, for example, an aqueous solution containing a minor portion, for example, from about under one percent up to about 25 percent, of alcohol, to give in either event a clear solution, that is, one that does not exhibit any undesirable opalescence, turbidity, or precipitation. Both the non-ionic wetting agents directly soluble in water and those soluble in an essentially aqueous medium of the type just indicated to give a clear solution are herein and in the appending claims generically included when reference is made to water-soluble, non-ionic wetting agents. Other more detailed characteristics of the applicable wetting agents are given hereinbelow.

The compositions embraced by this invention include the selected water-insoluble antibiotic and selected water-soluble, non-ionic wetting agent alone as the only essential ingredients carried in the water or other essentially aqueous medium such as one containing a major portion of water and a minor portion of alcohol, for example, from as little as one percent or even less up to about 25 percent of alcohol, or the compositions may also contain in addition to these two essential ingredients other ingredients serving, for example, as buffering agents to control the hydrogen ion concentration of the composition, or as flavoring agents, or they may also contain, with or without any buffering and flavoring agents, other therapeutically effective constituents, such as some other antibacterial agent as a sulfonamide or a phenol and the like or a vaso-constricting or pressor agent, as well as a preservative if desired, and the like.

With such available variations in the individual, possible compositions embraced by the invention, the corresponding clear, stable preparations containing tyrothricin in a substantially aqueous medium may be extensively employed in medication in many various applications and especially for use by topical and oral administration and particularly to the mucous membranes of the various body cavities such as the eye, ear, nose and throat, and the alimentary and genito-urinary tracts, and also intraperitoneally, as well as into the pleural cavity, and also on open wounds.

Thus, the compositions of the invention are applicable in the form of a stable concentrate of tyrothricin clearly dissolved in an aqueous medium with the selected applicable, water-soluble, non-ionic wetting agent, or as a tyrothricin nose drop, or ear drop, eye wash, mouth wash, or wet dressing, or lozenge, tablet, bougie, suppository or ointment, jelly, and the like, any one or all of which may consist primarily essentially of the water-insoluble, antibacterially active agent, such as especially tyrothricin, dissolved in the aqueous medium containing the selected water-soluble, non-ionic wetting agent of the type herein described as suitable, with or without the addition of any individually desired, compatible buffering agent or mixture thereof and of any desired, compatible flavoring oil or mixture thereof as well as of any suitable preservative.

The compositions of the invention may be illustrated by, but not restricted to, the following:

*Example 1.—Tyrothricin concentrate*

| | |
|---|---|
| Tyrothricin | 2.5 grams |
| Ethanol | 25.0 c. c./100 c. c. of concentrate |
| Non-ironic wetting agent, polyoxyalkylene hexitol inner anhydride ester of sorbitan mono-oleate | 25.0 grams/100 c. c. of concentrate |
| Water sufficient to make 100 c. c. | |

*Example 2.—Tyrothricin eye wash*

| | Percent |
|---|---|
| Tyrothricin | 0.02 |
| Non-ionic wetting agent (same as in Example 1) | 0.1 |
| Hydrastine hydrochloride | 0.02 |
| Berberine acid sulfate | 0.02 |
| Camphor | 0.02 |
| Sodium borate | 2.2 |
| Boric acid | 0.92 |
| Sodium benzoate | 0.05 |
| Water sufficient to make 100% | |

*Example 3.—Tyrothricin solution*

| | Percent |
|---|---|
| Tyrothricin | 0.05 |
| Non-ionic wetting agent (same as in Example 1) | 0.50 |
| Ethanol | 1.00 |
| Propylene glycol (to make solution isotonic) | 0.80 |
| Preservative—oxyquinoline benzoate | 0.04 |
| Water sufficient to make 100% | |

*Example 4.—Tyrothricin nose drops*

| | Percent |
|---|---|
| Tyrothricin | 0.02 |
| Beta-phenylpropanolamine hydrochloride | 1.5 |
| Saccharin soluble | 0.02 |
| Sodium bisulfite | 0.02 |
| Non-ionic wetting agent (same as in Example 1) | 0.20 |
| Ethanol | 0.38 |
| Phenyl mercuric acetate (preservative) | 0.002 |
| Water sufficient to make 100% | |

While the preceding examples of the compositions of the invention comprising tyrothricin and the selected water-soluble, non-ionic wetting agent of the type herein described show a concentrate, an eye wash, a solution (applicable for irrigations, for wet dressing, and the like), and nose drops, the stable, clear, aqueous solutions of the invention can also be prepared as an auristilla, nebula, or other form of spray for use in otorhinolaryngology, and the aqueous solution of the two essential ingredients may also be incorporated in jellies, emulsions and ointments, in which the tyrothricin is contained dissolved in the aqueous phase.

While each of the preceding particular examples of clear, stable, aqueous compositions containing tyrothricin and a water-soluble, non-ionic wetting agent has been given with the respectively specific, individual ingredients noted, any of the individual ingredients may be replaced, in whole or in part, by any other having the required characteristics for the respective purpose for which the specific ingredient was included in the composition. Thus, while the invention is especially effective with tyrothricin, the latter may be replaced by any other water-insoluble, polypeptide, antibacterial antibiotic.

The water-soluble, non-ionic wetting agent need not be restricted to the polyoxyalkylene hexitol inner anhydride ester of sorbitan mono-oleate, but may be replaced by any other of the series of water-soluble of polyoxyalkylene derivatives of hexitol inner anhydrides partial long chain fatty acid esters as the sorbitan mono-laurate polyoxyalkylene derivative, sorbitan mono-palmitate polyoxyalkylene derivative, sorbitan mono-stearate polyoxyalkylene derivative, and mannitan mono-palmitate polyoxyalkylene derivative (the mannitol isomer of the sorbitan mono-palmitate polyoxyalkylene derivative or by a water-soluble polyoxyalkylene alkyl-phenyl ether as the poyoxyalkylene glycol mono-isooctyl-phenyl ether, and the like, all of which advantageously contain at least four ethenoxy groups. Thus, for example, in Example 4, the specific non-ionic wetting agent may be replaced by the same percentage of sorbitan mono-palmitate (or mono-stearate) polyoxyalkylene derivative or of the mannitol isomer of the sorbitan mono-palmitate polyoxyalkylene derivative, or by 0.5% of the sorbitan mono-laurate polyoxyalkylene glycol mono-isooctyl-phenyl ether.

Similarly, in Example 4 the beta-phenylpropanolamine hydrochloride need not necessarily be present entirely as the hydrochloride for it could be used as any desired mixture of the hydrochloride, and any other suitable salt of the amine, and the free amine or base, for example, instead of 1.5% of the hydrochloride alone, there may be used 1.46% of the hydrochloride and 0.04% of the free amine or base, or the free amine or some other suitable salt of it may be used alone. Also, the beta-phenylpropanolamine may be replaced by any other phenalkylamine vasoconstricting or pressor agent such as ephedrine, desoxyephedrine, amphetamine, para-hydroxy-alpha-methyl-phenethylamine, beta-hydroxy-meta hydroxyphenethyl methylamine, and the like.

While each of the particular compositions of the individual, separate, complete examples may be prepared directly from the indicated ingredients by steps necessary to incorporate the water-insoluble antibiotic, each of them and any other composition embraced by the invention is conveniently prepared (if the ultimate composition is to, or may, contain any ethanol) by starting with a concentrate of the type shown in Example 1 and adding the other required ingredients and the required amount of water to finish with the specific concentration of tyrothricin desired for the particular composition concerned. If no ethanol is to be contained in such ultimate composition, it is advantageous to start with a concentrate which is free of alcohol.

The ethanol-free concentrate is of a composition similar to that of Example 1, but without its ethanol content and is prepared by initially dissolving the desired antibiotic as tyrothricin in a sufficient amount of the selected non-ionic, wetting agent of the type herein described, for example, one part of tyrothricin to about two and one-half parts of the selected water-soluble, non-ionic wetting agent, for example, polyoxyalkylene hexitol inner anhydride ester of sorbitan monooleate. The wetting agent may either be added to the tyrothricin or more advantageously the tyrothricin may be dusted over the surface of the wetting agent and the mixture stirred for sufficient time to produce thorough and uniform dispersion of the antibiotic in the wetting agent, which time in some cases may be as much as an hour or more and in other cases even less, and then letting the dispersion stand, with or without agitation, until the antibiotic has gone completely into solution in the wetting agent. Any desired quantity of water may then be added to give any desired initial or ultimate concentration of tyrothricin in the non-ionic wetting agent, aqueous vehicle. If desired, some water, such as a comparatively small quantity, may be included before and during the stirring in preparing the initial wetting agent, antibiotic dispersion.

The concentrate which may contain ethanol, for example, up to about 25% of it, in its composition is prepared by either wetting or dissolving the tyrothricin in the quantity of alcohol taken, for example, as to Example 1, two and one-half grams of tyrothricin is dissolved in the 25 c. c. of ethanol either by pouring the ethanol over the tyrothricin and stirring or by dusting the tyrothricin on the alcohol and stirring, to wet the tyrothricin with the alcohol. When less ethanol than the quantity sufficient to dissolve the amount of tyrothricin taken is employed, there need be used only sufficient ethanol to wet the tyrothricin. Then the required amount of the applicable water-soluble, non-ionic wetting agent of the type described is stirred into either the solution or dispersion of the tyrothricin in ethanol and stirring is conveniently continued for the sufficient time to produce a clear solution.

It is usually desirable that the tyrothricin be powdered before using it in preparing the concentrate, and when ethanol is used to dissolve the tyrothricin rather than merely to wet it, it is convenient to use from about ten to about twenty parts of the ordinary 95% ethanol, although slightly more may be suitable, for example, in a proportion sufficient to give up to about 25 c. c. of ethanol per 100 c. c. of the final concentrate, for example, as in Example 1.

As hereinabove described, there are provided the two types of concentrates, the one containing ethanol and other ethanol-free. Either type may contain any desired amount of tyrothricin such as up to about two and one-half percent and even up to above five percent, the maximum in any case being the total that will be dissolved in the quantity taken of the particular wetting agent used. Either type can be diluted with water to the extent necessary to give any desired concentration of the antibiotic such as tyrothricin in the finally desired composition. For most uses, for example, for wet dressing, the concentrate as in Example 1 may be diluted to fifty times its original volume. In such dilution, the concentrate may be added to the quantity of water used for dilution or the water may be added to the concentrate, in either case with only the necessary stirring to produce homogenous dilution, but in either event without any resulting opalescence or turbidity. The water for dilution is not restricted to distilled water as tap water, whether sterilized or not, may also be used just as effectively.

The concentrate, either of the ethanol-containing or the ethanol-free form, may occasionally contain a concentration of the tyrothricin and at times also of the selected water-soluble, non-ionic wetting agent, which might cause some type of toxic manifestation if such concentrate were used directly in some particular form of therapy. Actually, however, the concentrate is at any rate a complete, pharmaceutically useful preparation which is nevertheless prepared and sold as a finished, ready pharmaceutical preparation available for purchase by such users as the physician and clinician who, using distilled water usually sold along with the concentrate, or other water, dilutes the concentrate to the desired lower concentration of tyrothricin for the particular use that it is desired to make of it on the occasion. Such lower concentration is usually of the order of about as indicated in Examples 2, 3 and 4, and at such greater dilution no disturbing toxic manifestations are noted. Thus, while the composition of the invention, in some one of its forms may contain a selected water-soluble, non-ionic wetting agent which in some particular instance might cause some form of toxic manifestation when used in the particular high concentration, for example, as in the concentrate, the class of the water-soluble, non-ionic wetting agents from which there is selected the individual wetting agent to employ in any individual one of the compositions embraced by the invention, are non-ionic wetting agents, soluble in water or in essentially aqueous medium to give in either event a clear solution and which causes no undesirable, such as irreversible, toxic manifestation when used in the dosages required by the specific treatment.

If the ultimate composition is to contain other effective therapeutic ingredients or buffering or flavoring agents, or a preservative, and the like, the others may be added in suitable order either to the concentrate before dilution with water or to the diluted solution of the type above described. Thus, the tyrothricin nose drops as in Example 4 are prepared by starting with concentrate or diluted concentrate and then adding the required amount of the vaso-constricting agent either as the hydrochloride or as a mixture of the hydrochloride or other suitable salt and the free base. Then the other agents such as the soluble saccharin, the sodium bisulfite and the phenyl mercuric acetate are added.

In any individual composition prepared from the concentrate, the tyrothricin in the ultimate composition may vary up to about 0.05% or more depending upon the particular nature of the composition and the purpose for which it is to be applied. The ratio between the quantity of tyrothricin and the particular water-soluble, non-ionic wetting agent employed may be varied somewhat from agent to agent, for example, in the case of the sorbitan mono-laurate polyoxyalkylene derivative, it is advantageous that the quantity of it used be not less than about five times the quantity of tyrothricin. The same applies to the corresponding mono-palmitate and also mono-stearate derivative, whereas in the case of the corresponding mono-oleate derivative as well as with the polyoxyalkylene mono-isooctylphenyl ether, it is advantageous that the quantity of such agent be not less than about ten times the amount of tyrothricin.

In the various compositions embraced by the invention and prepared according to it, the tyrothricin is retained in the clear solution and the composition is stable even against the addition of electrolytes. Thus, it can be diluted infinitely with physiological salt solution, glycerine, propylene glycol, or other agents without clouding or precipitation of the tyrothricin.

However, in any event, to obtain the clear, stable solution it is necessary to dissolve the tyrothricin, whether or not accompanied by ethanol, either directly in the selected water-soluble, non-ionic wetting agent alone or together with a minor portion of the water to be contained in the final composition.

While the specific complete examples above include an advantageously applicable wetting agent and the subsequent description sets forth that it may be replaced in any of the compositions by certain others specifically noted, among the wetting agents having the characteristics herein noted as necessary for the invention, are useful the non-ionic, water-soluble wetting agents, and especially those, the chemical structure of which includes a polyoxyalkylene group, such as the so-called "polyglycol" radical, and especially those having at least four ethenoxy (—O—C₂H₄—) groups, for example, the tetra-ethylene glycol radical, —O—CH₂—CH₂—O—CH₂—CH₂—O—CH₂—CH₂—O—CH₂—CH₂—OH, such as the polyoxyalkylene derivatives of substituted-cyclic compounds as substituted-aryl compounds as benzene and naphthalene and substituted-cyclicized inner anhydrides (or inner ethers) of aliphatic, straight chain polyhydric alcohols, which derivatives include the water-soluble ethers resulting from the condensation of such polyoxyalkylene grouping with such cyclic compound having in its structure a long-chain aliphatic grouping. Such condensation products for brevity are generally referred to herein as water-soluble polyoxyalkylene higher-alkyl-group-containing-cyclic-radical ethers, in which the alkyl group may be directly attached to the cyclic radical such as the phenyl radical or maybe the terminal group of a hetero-side-chain, for example, the aliphatic residue of a fatty acid esterified with the hydroxyl radical of a carbinol substituent linked to one of carbon atoms of the cyclic compound as in a cyclicized inner anhydride. Such polyoxyalkylene ethers are selected from and illustrated by, but not restricted to, the water-soluble, polyoxyalkylene derivatives of the fatty acid esters, especially mono-esters, of the inner anhydrides (or inner ethers) of aliphatic, straight-chain polyhydric alcohols, particularly the six-carbon atom, hexahydric alcohols, and more particularly the water-soluble polyoxyalkylene derivatives of the fatty acid mono-esters of the inner ethers of such hexahydric alcohols as sorbitol, mannitol, dulcitol, and the like, and the water-soluble polyoxyalkylene alkyl-phenyl ethers, and preferably contain at least four ethenoxy groups.

The suitable, water-soluble polyoxyalkylene derivatives of the fatty acid mono-esters of the inner anhydrides (or inner ethers) of such polyhydric or hexahydric alcohols are illustrated by the above mentioned water-soluble polyoxyalkylene derivatives of hexitol inner anhydrides partial, long chain fatty acid esters of column 3, lines 32–40.

The water-soluble polyoxyalkylene alkyl-phenyl ethers, among which those in which the alkyl substituent is higher-alkyl are advantageously effective, are illustrated by, but not restricted to, the non-ionic, water-soluble polyoxyalkylene alkylphenyl ether wetting agents such as the polyoxyalkylene glycol mono-isooctyl-phenyl ether.

These water-soluble polyoxyalkylene derivatives of the above described substituted-cyclic-compounds are prepared by introducing, according to the method described in U. S. Patent No. 1,970,578, a polyoxyalkylene group into such substituted-cyclic compound containing a reactive hydroxyl group attached to a ring carbon atom, either directly or forming with it a carbinol group. Thus, the water-soluble polyoxyalkylene alkyl-phenyl ethers, exemplified by polyoxyalkylene glycol mono-isooctyl-phenyl ether may be prepared by condensing mono-isooctyl-phenol with the corresponding quantity of ethylene oxide as described in said patent or by the correspondingly equivalent alternative procedure therein described to introduce at least four ethenoxy groups, as at least the tetra-ethylene glycol radical. Similarly, the suitable water-soluble, polyoxyalkylene derivatives of the fatty acid mono-esters of the inner ethers of the hexahydric alcohols are prepared by treating, according to the same Patent No. 1,970,578, the required fatty acid mono-ester of the inner ether of the selected hexahydric alcohol, the preparation of which fatty acid mono-esters of said inner ethers is described in U. S. Patent No. 2,322,820.

Accordingly, it is seen that the starting materials for the preparation of the fatty acid mono-esters of said inner ethers are, for example, advantageously the hexahydric alcohols as sorbitol, mannitol, dulcitol, and the like, which are cyclicized by the removal of one molecule of water between two of the hydroxyl groups of such hexahydric alcohol with the resulting formation of a mono-inner ether, referred to as a hexitan. Thus, for example, if such removal of a molecule of water (which may be referred to as anhydrization) is between the hydroxyl groups attached to the first and fifth carbon atoms of the hexahydric alcohol, the resulting inner ether or cyclicized condensation product is illustrated by the compound shown by the structural formula in said Patent No. 2,322,820, at page 2, column 1, lines 18–23. When the molecule of water is removed from the hydroxyl groups attached to the first and fourth carbon atoms of the hexahydric alcohol, the cyclicized condensation product, or inner ether or hexitan, is illustrated by the compound shown by the structural formula at lines 1–5 of the same page and column of said patent. Since the hexitans still contain several hydroxyl groups, a second molecule of water can be removed in the same way to form a double inner ether. Thus, if the second molecule of water is removed from between the hydroxyl groups attached to the third and fifth carbon atoms of the second of the just above described mono-inner ethers or hexitans, the resulting binuclear cyclicized condensation product is illustrated by the compound shown by the structural formula at lines 33–37 of the same page and column of said patent, which double inner ether is therein referred to as a hexide.

For brevity the hexitans are referred to as monoanhydro hexitols and the hexides are referred to as dianhydro hexitols. A hydroxyl group attached to a ring carbon atom and forming with it a carbinol group, as referred to at column 8, lines 24–26, is exemplified by a hydroxyl group such as is attached to the carbon atom in the second and third position in the above described hexitans or the carbon atom in the fourth position in the first of them.

Since the hexitans and hexides still contain at least one hydroxyl group, they are esterified with the required amount of the selected fatty acid, and especially advantageously with a higher-alkyl fatty acid containing about six or eight or more carbon atoms in the aliphatic chain, according to said patent and its respectively corresponding examples, to give the necessary fatty acid mono-esters of said inner ethers.

The alkyl group introduced by the fatty acid employed in the just above described procedure, into the resulting carboxylate grouping exemplifies the alkyl radical which is the terminal group of a hetero-side chain referred to at column 7, lines 55–63.

The various, water-soluble, non-ionic wetting agents are non-volatile, heat-stable, usually viscous or oily liquids to oily solids, some of which tend to gel on standing. The various respective hexitan fatty acid mono-ester polyoxyalkylene derivatives above identified have the respective properties following, wherein those in column A are of the sorbitan mono-laurate example in column B the sorbitan mono-palmitate, in column C the sorbitan mono-stearate and in column D the sorbitan mono-oleate example:

| Physical Characteristic | A | B | C | D |
| --- | --- | --- | --- | --- |
| Form at 25° C | (1) | (2) | (2) | (1) |
| Viscosity cp. at 25° C | 250–400 | 400–600 | 400–600 | 600–800 |
| Specific gravity | 1.08–1.13 | 1.05–1.10 | 1.05–1.10 | 1.05–1.10 |
| Flash point, °F | 610 | | | |
| Fire point, °F | 655 | | | |
| Surface tension in distilled water dynes/cm. at 25° C.: | | | | |
| a. 0.001% solution | 50 | 50 | 51 | 53 |
| b. 0.01% solution | 39 | 43 | 46 | 45 |
| c. 0.1% solution | 37 | 41 | 44 | 42 |
| d. 1.0% solution | 36 | 40 | 43 | 41 |
| e. 5.0% solution | 35 | 39 | 42 | 40 |
| f. 1% solution—hard water, 500 P.P.M. | 36.0 | 38.0 | 42.4 | 39.6 |
| g. 1% solution—5% H₂SO₄ | 35.2 | 38.0 | 40.6 | 39.6 |

$^1$ Oily liquid.
$^2$ Oily liquid (tends to gel on standing).

At 25° C. all of the four above wetting agents are completely readily soluble in distilled water, in hard water containing even as much as 20,000 P. P. M. of hardness, in 5% solutions of sulfuric acid, sodium hydroxide, sodium sulfate, or aluminum chloride, and also in toluene, ethylene glycol monoethyl ether, carbon tetrachloride, methanol, ethanol, ethylacetate and aniline.

In any of the compositions covered by the invention it is not necessary that a single, individual water-soluble, non-ionic wetting agent be employed, for a mixture of any of the indicated suitable agents can be employed and is so used. Accordingly, the expression, a water-soluble, non-ionic wetting agent, herein and in the appending claims is used generically to embrace a mixture of the suitable wetting agents as well as an individual such agent.

In the various compositions embraced by the invention it is possible to use the applicable antibiotic antibacterial agent in a quantity sufficient to have the composition bacteriostatic. Thus, it is possible to use a concentration of the antibiotic and particularly of tyrothricin from as little as about 0.02 percent as in a dilute solution such as the eye wash of Example 2 or the nose drops of Example 4 up to about 5 percent and even up to the limit of the solubility of the antibiotic as tyrothricin in the particular composition being prepared, for example, in a concentrate.

At column 3, lines 6 to 24, it is indicated that the compositions of matter of the invention are applicable in various forms including such that are not per se solutions, as the lozenge, tablet, bougie, suppository, and the like. In some cases the solution is used in the steps of manufacturing these forms and in some instances the water may be evaporated from the aqueous phase as is not uncommon in the art in the production of tablets, lozenges, or bougies and the like. This leaves in the dried residue the wetting agent which is available, when these dosage forms are dissolved in the fluids, for example in the gastrointestinal tract or other body cavity, or in the saliva, to promote the re-dissolving of the tyrothricin. It might also be possible to use in the preparation of such dosage forms as just noted the ethanol-free concentrate consisting only of the tyrothricin and the water-soluble, non-ionic wetting agent, as referred to at column 5, lines 10–31.

While the invention has been illustrated by certain individual specific embodiments of it, it is understood that variations, substitutions and modifications may be made to the extent of the scope of the appending claims.

What is claimed is:

1. A bacteriostatic composition of matter consisting of a clear, essentially aqueous solution comprising tyrothricin in a concentration greater than its solubility in water, and a water-soluble, non-ionic wetting agent which is a polyoxyalkylene derivative of a partial, long chain fatty acid ester of a hexitol inner anhydride, having at least four ethenoxy groups.

2. A bacteriostatic composition of matter consisting of a clear, essentially aqueous solution comprising tyrothricin in a concentration greater than its solubility in water, and a water-soluble, non-ionic wetting agent which is a polyoxyalkylene derivative of a partial, long chain fatty acid ester of a hexitol inner anhydride.

3. A bacteriostatic composition of matter consisting of a clear, essentially aqueous solution comprising a water-insoluble, antibiotic, polypeptide antibacterial agent in a concentration greater than its solubility in water and a water-soluble, non-ionic wetting agent which is a polyoxyalkylene higher-alkyl-group-containing-cyclic-radical ether having the alkyl group directly attached to the cyclic radical.

4. A bacteriostatic composition of matter containing a water-insoluble, antibiotic, polypeptide antibacterial agent in a concentration greater than its solubility in water clearly dissolved in an aqueous medium comprising a non-ionic wetting agent which is soluble in an essentially aqueous medium to give a clear solution, the wetting agent being a polyoxyalkylene higher-alkyl-group-containing-cyclic-radical ether having the alkyl group directly attached to the cyclic radical.

5. A composition of matter containing a water-soluble, non-ionic wetting agent, which is a polyoxyalkylene higher-alkyl-group-containing-cyclic-radical ether having the alkyl group directly attached to the cyclic radical and a water-insoluble antibiotic, polypeptide antibacterial agent dispersed in said composition and which composition is soluble in an essentially aqueous medium to yield a clear solution containing the antibacterial agent in a concentration greater than its solubility in water.

6. A composition of matter as in claim 5 in which the antibacterial agent is tyrothricin.

7. A bacteriostatic composition of matter consisting of an essentially aqueous solution free from cloudiness at room temperatures and comprising tyrothricin in a concentration greater than its solubility in water, and a water-soluble, non-ionic wetting agent adapted to dissolve the tyrothricin in the aqueous medium of the solution, the wetting agent being a polyoxyalkylene higher-alkyl-group-containing-cyclic-radical ether having the alkyl group directly attached to the cyclic radical.

8. A bacteriostatic composition of matter consisting of an essentially aqueous solution free from cloudiness at room temperatures and comprising tyrothricin in a concentration greater than its solubility in water, and a water-soluble, non-ionic wetting agent comprising a higher-fatty acid mono-ester of a polyoxyalkylene derivative of a hexitol inner anhydride.

9. A bacteriostatic composition as in claim 8 wherein the higher-fatty acid mono-ester of a polyoxyalkylene derivative of a hexitol inner anhydride is the sorbitan monooleate polyoxyalkylene derivative of the hexitol inner anhydride.

PAUL W. WILCOX.
BERNARD B. JATUL.

REFERENCES CITED

The following references are of record in the file of this patent:

UNITED STATES PATENTS

| Number | Name | Date |
|---|---|---|
| 2,417,299 | Freedman et al. | Mar. 17, 1947 |

OTHER REFERENCES

Trans. Amer. Acad. Ophthalmology and Laryngology; Aug. 1943; page 433.

Bellows: Archives of Ophthalmology, vol. 29, pages 889 to 892. Copy in Div. 43.

Struble: Journal of the Am. Med. Assn., vol. 125, page 687, July 8, 1944. Copy in S. L.

Silbergleit: Jour. A. M. A., Prac. Pharm. Ed., Sept. 1944, pp. 232–3, 234. Copy in S. L.

Fisher: Amer. Jour. of Pub. Health, Apr. 1942, pages 389 to 394. Copy in Div. 43.

Atlas Spans and Atlas Tweens, page 7, Nov. 1942. Copy in Div. 43.